United States Patent
Pang

(10) Patent No.: US 11,519,588 B2
(45) Date of Patent: Dec. 6, 2022

(54) FIXING CLAMP AND HANGING LAMP

(71) Applicant: ZHEJIANG TOPMB ELECTRICAL LIGHTING CO., LTD, Shaoxing (CN)

(72) Inventor: Lingling Pang, Shaoxing (CN)

(73) Assignee: Zhejiang Topmb Electrical Lighting Co., Ltd., Shaoxing (CN)

( * ) Notice: Subject to any disclaimer, the term of this patent is extended or adjusted under 35 U.S.C. 154(b) by 0 days.

(21) Appl. No.: 17/230,755

(22) Filed: Apr. 14, 2021

(65) Prior Publication Data
US 2022/0325875 A1   Oct. 13, 2022

(30) Foreign Application Priority Data

Mar. 9, 2021 (CN) .......................... 202110258120.1
Mar. 9, 2021 (CN) .......................... 202120502970.7

(51) Int. Cl.
*F21V 21/088* (2006.01)
*F16B 2/06* (2006.01)

(52) U.S. Cl.
CPC .............. *F21V 21/088* (2013.01); *F16B 2/06* (2013.01)

(58) Field of Classification Search
CPC .... F21V 21/088; F21V 21/0885; F21V 21/08; F21V 21/116; F16B 2/06; F16M 13/022; F16M 2200/04; F16M 2200/041; F16M 2200/044; F16M 2200/047; F16M 2200/048; F16M 11/10
USPC .................... 248/123.11, 123.2, 292.11, 325
See application file for complete search history.

(56) References Cited

U.S. PATENT DOCUMENTS

| | | | | |
|---|---|---|---|---|
| 2,440,873 A | * | 5/1948 | Popp | F16M 13/022 248/284.1 |
| 4,494,177 A | * | 1/1985 | Matthews | F16M 11/10 248/162.1 |
| 4,630,185 A | * | 12/1986 | Copeland | F21V 21/32 362/269 |
| 4,639,843 A | * | 1/1987 | Compton | F21S 8/086 362/431 |
| 5,276,597 A | * | 1/1994 | Herst | F21S 2/00 362/225 |

(Continued)

*Primary Examiner* — Jong-Suk (James) Lee
*Assistant Examiner* — James M Endo
(74) *Attorney, Agent, or Firm* — Wood, Phillips, Katz, Clark & Mortimer

(57) ABSTRACT

The present invention discloses a fixing clamp, including an object connecting structure, a first clamping structure, a second clamping structure and a third clamping structure arranged in sequence, wherein the object connecting structure is arranged on the first clamping structure for connecting an object to be fixed, and the first clamping structure and the third clamping structure are rotationally mounted on two ends of the second clamping structure respectively; at least one of the second clamping structure and the third clamping structure is equipped with a counterweight structure; and the first clamping structure includes a first connecting part connected to the second clamping structure, and an abutting part protruding from the first connecting part. By means of rotation of the first clamping structure and the second clamping structure and rotation of the second clamping structure and the third clamping structure, the present invention is applicable to screens in various shapes, the center of gravity is easier to adjust, and the use is convenient.

9 Claims, 10 Drawing Sheets

(56) References Cited

U.S. PATENT DOCUMENTS

| | | | | |
|---|---|---|---|---|
| 5,379,201 A * | 1/1995 | Friedman | ............ | F21V 33/0052 362/191 |
| 6,203,175 B1 * | 3/2001 | Basacchi | ............ | F21S 9/02 362/287 |
| 7,618,202 B2 * | 11/2009 | Xiao | ............ | G06F 1/1607 248/226.11 |
| 7,931,243 B2 * | 4/2011 | Yim | ............ | G06F 1/1607 248/229.13 |
| 8,797,456 B2 * | 8/2014 | Liang | ............ | H04N 5/2251 348/376 |
| 10,488,035 B1 * | 11/2019 | Yang | ............ | F21V 21/088 |
| 2002/0097571 A1 * | 7/2002 | Chen | ............ | F21V 21/088 362/98 |
| 2003/0147206 A1 * | 8/2003 | Chen | ............ | G06F 1/1601 361/679.55 |
| 2005/0151042 A1 * | 7/2005 | Watson | ............ | F16M 13/022 248/226.11 |
| 2006/0256584 A1 * | 11/2006 | Paoluccio | ............ | F21S 2/005 362/652 |
| 2007/0001071 A1 * | 1/2007 | Yeh | ............ | F16M 13/022 248/179.1 |
| 2007/0175516 A1 * | 8/2007 | Tseng | ............ | F21V 21/002 137/231 |
| 2007/0212057 A1 * | 9/2007 | Liang | ............ | G03B 17/00 396/428 |
| 2013/0284879 A1 * | 10/2013 | Low | ............ | F16M 13/00 248/558 |
| 2014/0285993 A1 * | 9/2014 | Fisher | ............ | G03B 15/03 362/6 |
| 2014/0355139 A1 * | 12/2014 | Begay | ............ | F16M 11/041 359/818 |
| 2015/0362826 A1 * | 12/2015 | Araki | ............ | F16M 11/10 348/46 |
| 2016/0281968 A1 * | 9/2016 | Sung | ............ | F21V 21/30 |
| 2018/0017204 A1 * | 1/2018 | Nokuo | ............ | F16M 11/10 |
| 2018/0363889 A1 * | 12/2018 | Yen | ............ | F21V 19/009 |

\* cited by examiner

FIXING CLAMP AND HANGING LAMP

TECHNICAL FIELD

The present invention relates to the field of fixing devices, and particularly relates to a fixing frame and a hanging lamp.

BACKGROUND ART

Nowadays, screen hanging lamps are more and more popular with consumers and are practical, and a screen hanging lamp mainly includes a light source and a fixing clamp. However, at present, the fixing clamp of hanging lamp is either applicable to displays with thicker frames, such as displays of desktop computers, or to displays with thinner frames, such as displays of notebook computers, and is not applicable to both; and the fixing clamp is not applicable to special-shaped screens.

SUMMARY OF THE INVENTION

In order to overcome the defects in the prior art, the present invention provides a fixing clamp and a hanging lamp using the fixing clamp. By means of rotation of a first clamping structure and a second clamping structure and rotation of a second clamping structure and a third clamping structure, the present invention is applicable to screens in various shapes, the center of gravity is easier to adjust, and the use is convenient.

In order to achieve the above objectives, the present invention is implemented by using the following technical solution:

A fixing clamp includes an object connecting structure, a first clamping structure, a second clamping structure and a third clamping structure arranged in sequence, wherein the object connecting structure is arranged on the first clamping structure for connecting an object to be fixed, and the first clamping structure and the third clamping structure are rotationally mounted on two ends of the second clamping structure respectively; at least one of the second clamping structure and the third clamping structure is equipped with a counterweight structure; and the first clamping structure includes a first connecting part connected to the second clamping structure, and an abutting part protruding from the first connecting part.

With the above structure, a user connects an object to be fixed to the object connecting structure, then abuts the abutting part in the first clamping structure against the clamped object, and adjusts the second clamping structure and the third clamping structure by means of rotation to enable the third clamping structure to be in contact with the clamped object, so that the fixing clamp is adapted to the shape of the clamped object for clamping. Furthermore, because at least one of the second clamping structure and the third clamping structure is equipped with the counterweight structure, by adjusting the second clamping structure and the third clamping structure by means of rotation, the position of the center of gravity of the fixing clamp can also be adjusted to balance the center of gravity between the object to be fixed and the fixing clamp, so as to prevent the fixing clamp being separated from the clamped object caused by imbalance of the center of gravity.

Of course, the user can also abut the abutting part in the first clamping structure against the clamped object, rotate the third clamping structure to the side away from the clamped object, and then rotate the second clamping structure to enable the second clamping structure to be in contact with the clamped object for fixation. The appearance of the product is properly processed to ensure that the second clamping structure can be in contact with the third clamping structure, thereby increasing the aesthetics and practicability of the product.

Further, both the second clamping structure and the third clamping structure are equipped with counterweight structures.

With the above structure, because the second clamping structure is rotationally connected to the first clamping structure and the third clamping structure is rotationally connected to the second clamping structure, by adjusting the second clamping structure by means of rotation, the center of gravity of the fixing clamp can be changed, and by adjusting the third clamping structure by means of rotation, the center of gravity of the fixing clamp can be changed. Therefore, by cooperative adjustment, the balance of the center of gravity of the fixing clamp can be realized more easily, which is convenient for the user to use.

Further, the counterweight structure includes a first counterweight, the second clamping structure is provided with a first accommodating cavity, and the first counterweight is placed in the first accommodating cavity;

the counterweight structure includes a second counterweight, the third clamping structure provided with a second accommodating cavity, and the second counterweight is placed in the second accommodating cavity.

Further, the second clamping structure is heightened to accommodate a larger first counterweight to facilitate the use.

Further, the second clamping structure includes a first adapter part provided with a first through hole, and the first clamping structure includes a first adapter matching part arranged on the side surface of the first adapter part and provided with a second through hole; the first adapter part and the first adapter matching part are rotationally connected by a first rotating shaft passing through the first through hole and the second through hole; both ends of the first rotating shaft are convexly provided with first anti-separating projections for preventing the first rotating shaft from separating from the first through hole and the second through hole;

the third clamping structure includes a second adapter part provided with a third through hole, and the second clamping structure includes a second adapter matching part arranged on the side surface of the second adapter part and provided with a fourth through hole; the second adapter part and the second adapter matching part are rotationally connected by a second rotating shaft passing through the third through hole and the fourth through hole; and both ends of the second rotating shaft are convexly provided with second anti-separating projections for preventing the second rotating shaft from separating from the third through hole and the fourth through hole.

Further, the first adapter matching part is recessed to form a first mounting cavity, the bottom surface of the first mounting cavity is provided with the second through hole, and the first anti-separating projection formed on the outer side of the second through hole is placed in the first mounting cavity; the first mounting cavity is provided with a first shielding cover for shielding the opening of the first mounting cavity in a matched mode;

the second adapter matching part is recessed to form a second mounting cavity, the bottom surface of the second mounting cavity is provided with the fourth through hole, and the second anti-separating projection formed on the outer side of the fourth through hole is placed in the second mounting cavity; and the second mounting cavity is provided with a second shielding cover for shielding the opening of the second mounting cavity in a matched mode.

With the above structure, the first anti-separating projection outside the first through hole and the second anti-separating projection outside the second through hole are hidden respectively by the first mounting cavity and the first shielding cover as well as the second mounting cavity and the second shielding cover, so that the appearance of the fixing clamp is more aesthetic.

Further, the first rotating shaft includes a first rotating shaft body and a first locking element, one end of the first rotating shaft body is convexly provided with a first anti-separating projection, the other end of the first rotating shaft body is detachably connected to the first locking element, and the first locking element protrudes from the first rotating shaft body to form the first anti-separating projection at one end of the first rotating shaft body on which the first locking element is mounted;

the second rotating shaft includes a second rotating shaft body and a second locking element, one end of the second rotating shaft body is convexly provided with a second anti-separating projection, the other end of the second rotating shaft body is detachably connected to the second locking element, and the second locking element protrudes from the second rotating shaft body to form the second anti-separating projection at one end of the second rotating shaft body on which the second locking element is mounted.

With the above structure, the first adapter matching part is placed on the outer side of the first adapter part, and the first rotating shaft body passes through the first through hole and the second through hole and is then connected to the first locking element, thereby realizing rotational mounting of the first adapter matching part and the first adapter part; and the second adapter matching part, the second adapter part, the second rotating shaft body and the second locking element can be rotationally mounted in the same mode as described above.

Further, the distance between the first locking element and the first anti-separating projection protruding from the first rotating shaft body can be adjusted; and the distance between the second locking element and the second anti-separating projection protruding from the second rotating shaft body can be adjusted.

With the above structure, by adjusting the distance between the first locking element and the first anti-separating projection protruding from the first rotating shaft body, the damping force between the first adapter matching part and the first adapter part can be adjusted; and by adjusting the distance between the second locking element and the second anti-separating projection protruding from the second rotating shaft body, the damping force between the second adapter matching part and the second adapter part can be adjusted.

Further, the first rotating shaft body is in threaded connection with the first locking element, and the second rotating shaft body is in threaded connection with the second locking element.

With the above structure, by means of threaded connection, the detachable connection between the first rotating shaft body and the first locking element as well as between the second rotating shaft body and the second locking element can be realized, and the distance between the first anti-separating projections protruding from the first rotating shaft body as well as between the second anti-separating projections protruding from the second rotating shaft body can be adjusted.

Further, both sides of the first adapter part are provided with the first adapter matching parts, and the diameter of the first anti-separating projection is greater than the aperture of the second through hole;

both sides of the second adapter part are provided with the second adapter matching parts, and the diameter of the second anti-separating projection is greater than the aperture of the fourth through hole.

With the above structure, the connection between the first adapter part and a first adapter connecting part as well as between the second adapter part and a second adapter connecting part is more stable; and the first anti-separating projections on both sides of the first rotating shaft can be hidden in the first mounting cavity, and the second anti-separating projections on both sides of the second rotating shaft can be hidden in the second mounting cavity.

Further, the first locking element uses an angular nut, and the first mounting cavity for accommodating the first locking element is matched with the first locking element; and the second locking element uses an angular nut, and the second mounting cavity for accommodating the second locking element is matched with the second locking element.

With the above structure, the first locking element uses an angular nut such as a hexagonal nut, the first locking element is placed in the first mounting cavity for accommodating the first locking element, and the first mounting cavity is matched with the first locking element to limit the first locking element so as to prevent the first locking element from rotating, which facilitates the mounting of the first rotating shaft body and the first locking element; and the mounting of the second locking element and the second mounting cavity for accommodating the second locking element is the same as described above.

Further, the second clamping structure includes a second connecting part provided with a groove and a first connecting cover configured to shield the opening of the groove of the second connecting part, and the second connecting part and the first connecting cover are clamped to form the first accommodating cavity;

the third clamping structure includes a third connecting part provided with a groove and a second connecting cover configured to shield the opening of the groove of the third connecting part, and the third connecting part and the second connecting cover are clamped to form the second accommodating cavity.

Specifically, the second connecting part is provided with a groove having an opening in a bottom surface, and the first connecting cover is convexly provided with a clamping stud toward the second connecting part; correspondingly, the bottom surface of the groove of the second connecting part is provided with a clamping cylinder matched with the clamping stud, the clamping stud is clamped into the clamping cylinder to realize the mounting of the second connecting part and the first connecting cover, and the first counterweight is provided with an avoiding area for avoiding the clamping cylinder; and the first adapter part is arranged on the first connecting cover, and the second adapter matching part is arranged on the second connecting part.

Specifically, the third connecting part is provided with a groove having an opening in a side surface, the edge of the opening of the groove of the third connecting part is recessed inward to form a step surface, and the second connecting cover is matched with the step surface to realize clamping.

Further, the inner side of the third clamping structure is provided with a non-slip pad.

With the above structure, the third clamping structure and the clamped object are prevented from slipping, so that the clamping capability of the fixing clamp is improved.

A hanging lamp includes a light source and a fixing clamp, wherein the fixing clamp uses the above fixing clamp, and the light source is connected to the object connecting structure.

With the above structure, by adjusting the fixing clamp, the hanging lamp can be applicable to various special-shaped screens without the need for a square display screen, and is also applicable to display screens in various thicknesses, so that the hanging lamp has better applicability.

Further, the hanging lamp includes a power supply structure provided with a power input port and a conductive output element, wherein the power supply structure is placed in the fixing clamp, the surface of the fixing clamp is provided with a first opening for exposing the power input port, the conductive output element is arranged close to the end surface of the object connecting structure in contact with the light source, and the end surface of the object connecting structure in contact with the light source is provided with second openings for exposing the conductive output element; and correspondingly, the light source is provided with a conductive input element matched with the conductive output element.

With the above structure, an external power wire is connected to the power input port, and the conductive input element of the light source is connected to the conductive output element, thereby realizing power transmission.

Specifically, the object connecting structure is provided with an accommodating cavity for accommodating the power supply structure; and the conductive output element is a conductive sheet, the conductive input element is a conductive terminal, and the conductive terminal is in contact with the conductive sheet to conduct electricity.

Further, the second opening is a sliding groove, and the conductive input element is matched with the second opening slidably.

With the above structure, the light source is rotated, and the conductive input element slides along the second opening and can be connected to the conductive output element to realize angle adjustment of the light source.

Further, the object connecting structure is provided with a first attracting element, and the light source is provided with a second attracting element matched with the first attracting element; the light source is fixed by means of cooperation of the first attracting element and the second attracting element; and specifically, the first attracting element and the second attracting element are respectively a magnet and a metal that can be attracted by the magnet.

Further, the object connecting structure and the light source are connected and fixed to each other in a form of buckling.

Specifically, the shape of the object connecting structure is matched with the shape of the light source, and an elastic gap is formed to obtain elasticity, such that the fixation and separation of the light source are realized by elastically opening and closing the gap. Generally, under the condition that the object connecting structure and the light source are connected to each other in a form of buckling, the external power wire is directly connected to the light source. The object connecting structure is provided with an avoiding hole for connection of the external power wire and the light source.

Compared with the prior art, the present invention has the following beneficial effects:

(1) According to the fixing clamp and the hanging lamp using the fixing clamp in the present invention, by means of rotation of the first clamping structure and the second clamping structure and rotation of the second clamping structure and the third clamping structure, the present invention is applicable to screens in various shapes, the center of gravity is easier to adjust, and the use is convenient.

(2) According to the fixing clamp and the hanging lamp using the fixing clamp in the present invention, both the second clamping structure and the second clamping structure are provided with counterweight structures to further facilitate the adjustment of the center of gravity.

(3) The fixing clamp and the hanging lamp using the fixing clamp in the present invention are reasonable in structural design.

Figure 1:
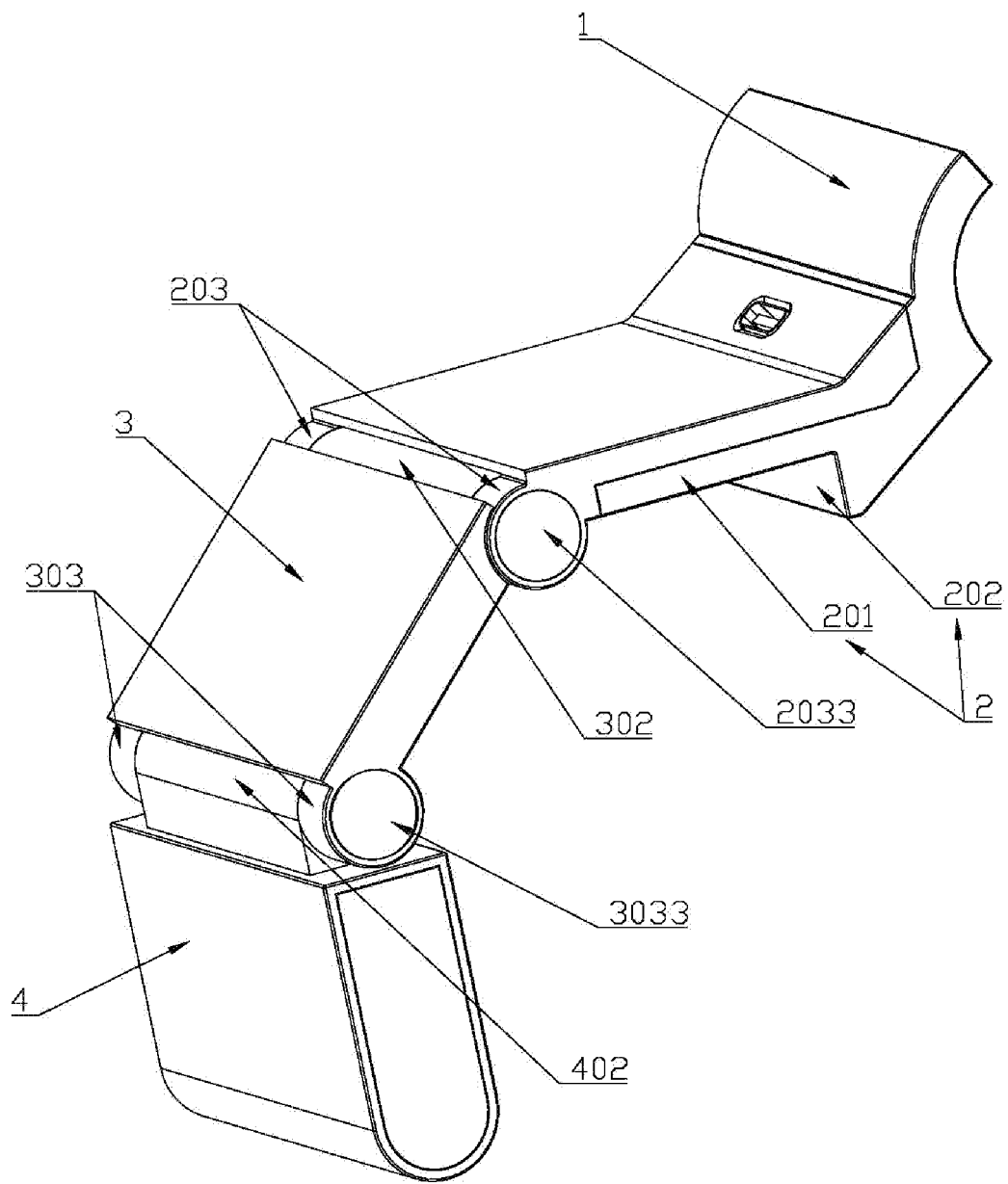
FIG. 1 is a schematic structural diagram of a fixing clamp according to the present invention.
Figure 2:
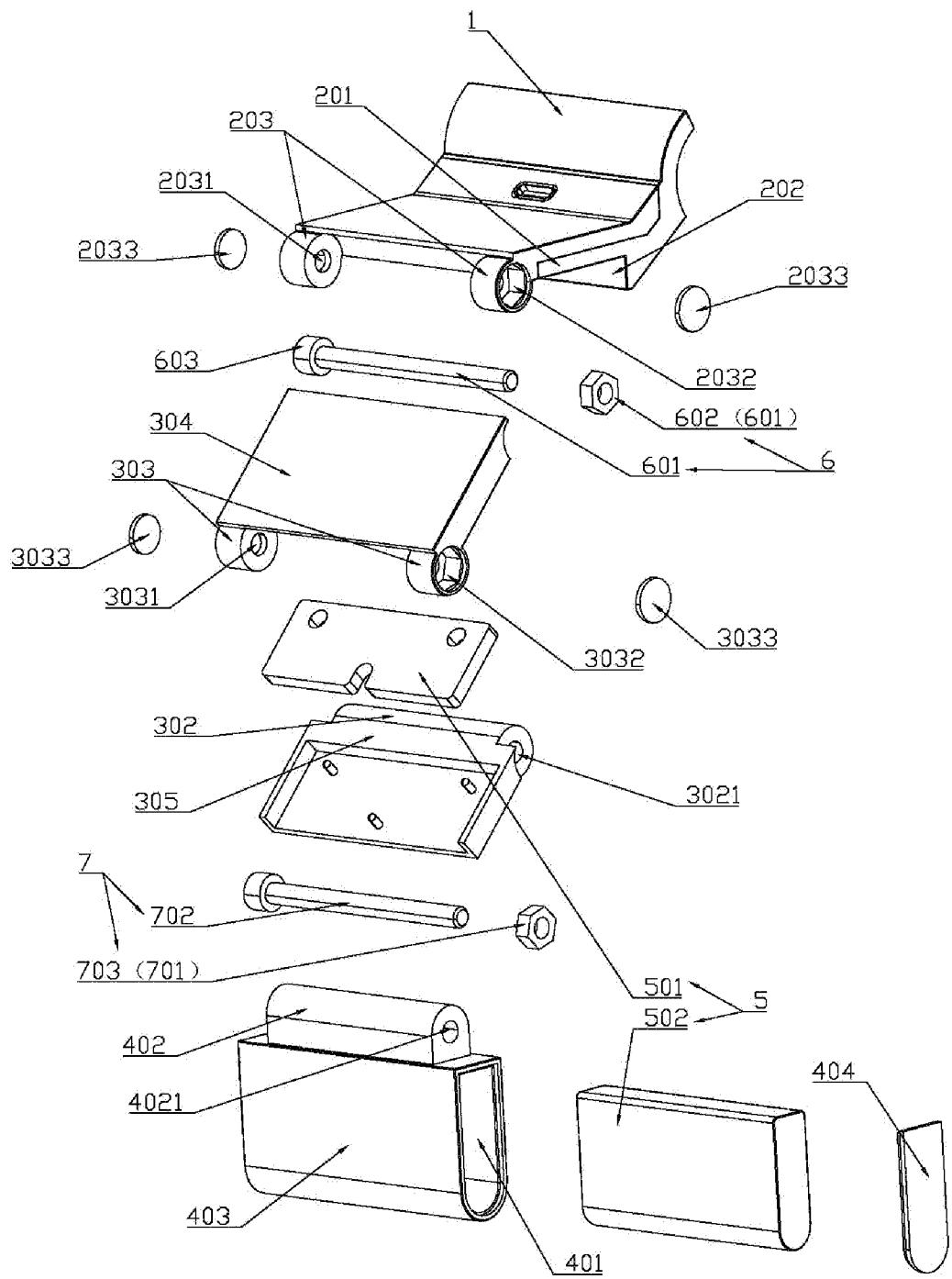
FIG. 2 is a schematic exploded diagram of a fixing clamp according to the present invention.
Figure 3:
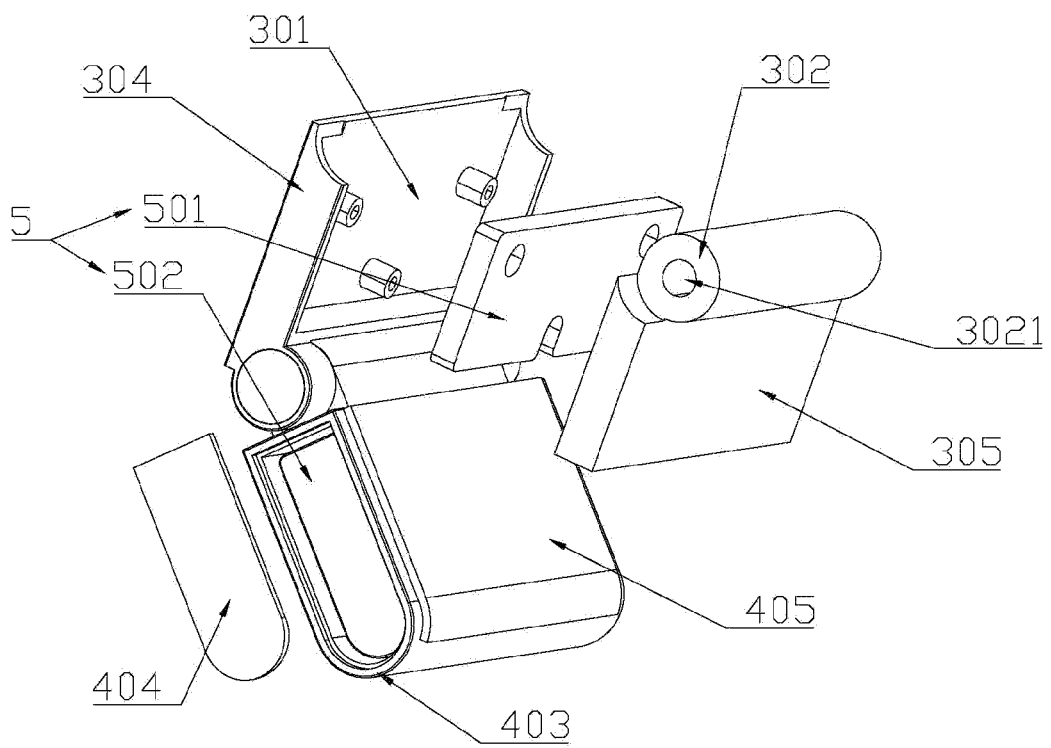
FIG. 3 is a schematic structural diagram of a second clamping structure and a third clamping structure in a fixing clamp according to the present invention.
Figure 4:
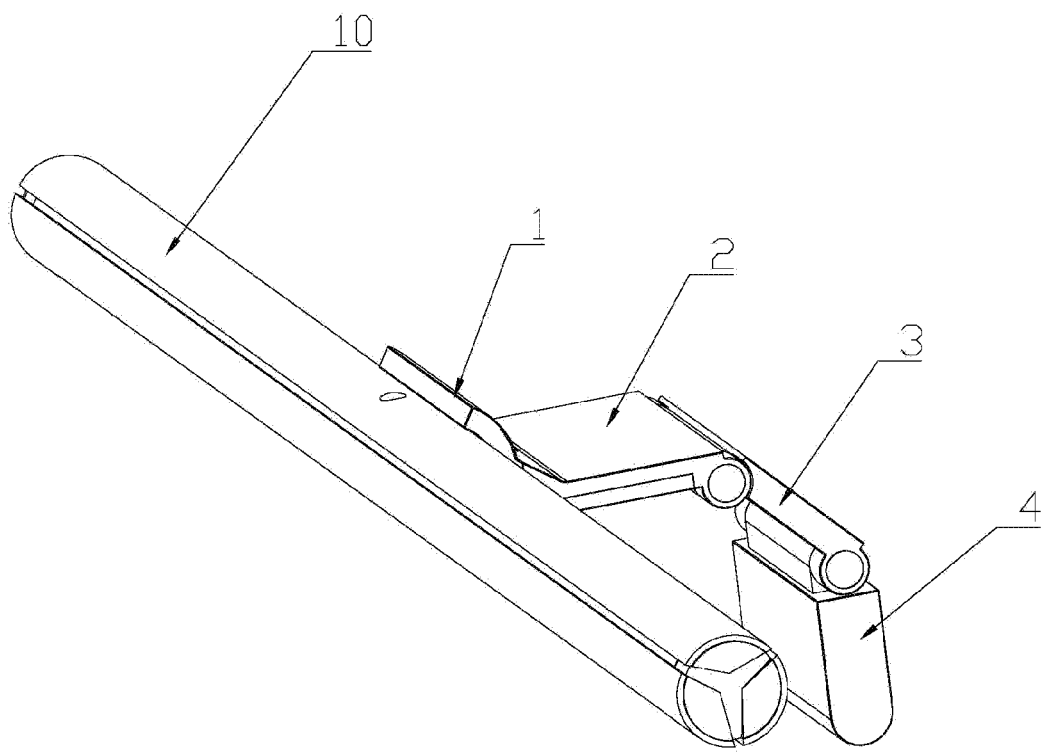
FIG. 4 is a schematic structural diagram of a hanging lamp according to the present invention.
Figure 5:
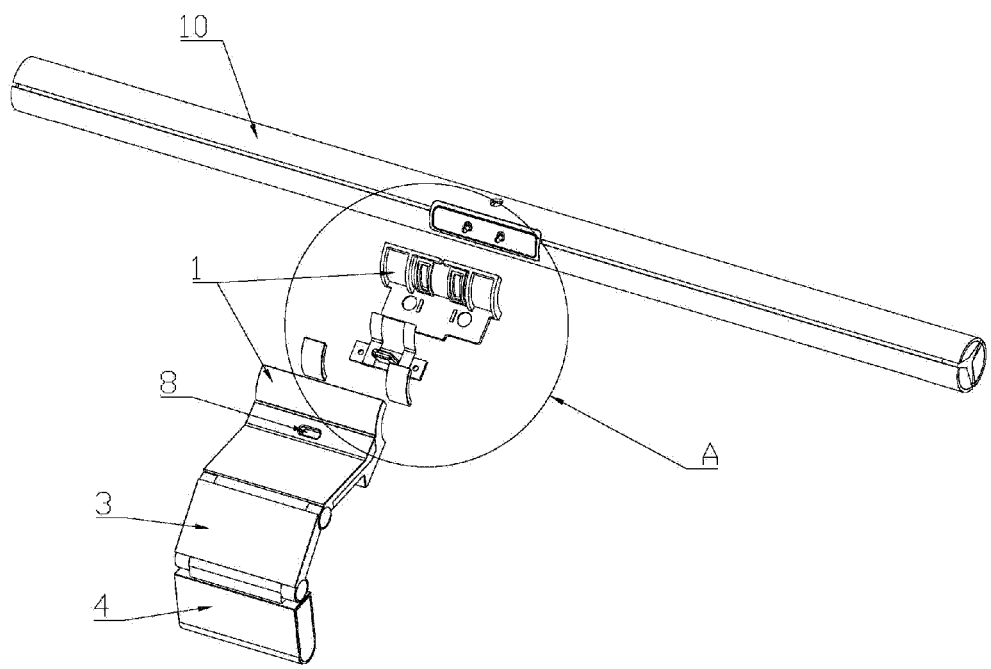
FIG. 5 is a schematic exploded diagram of a hanging lamp according to the present invention.
Figure 6:
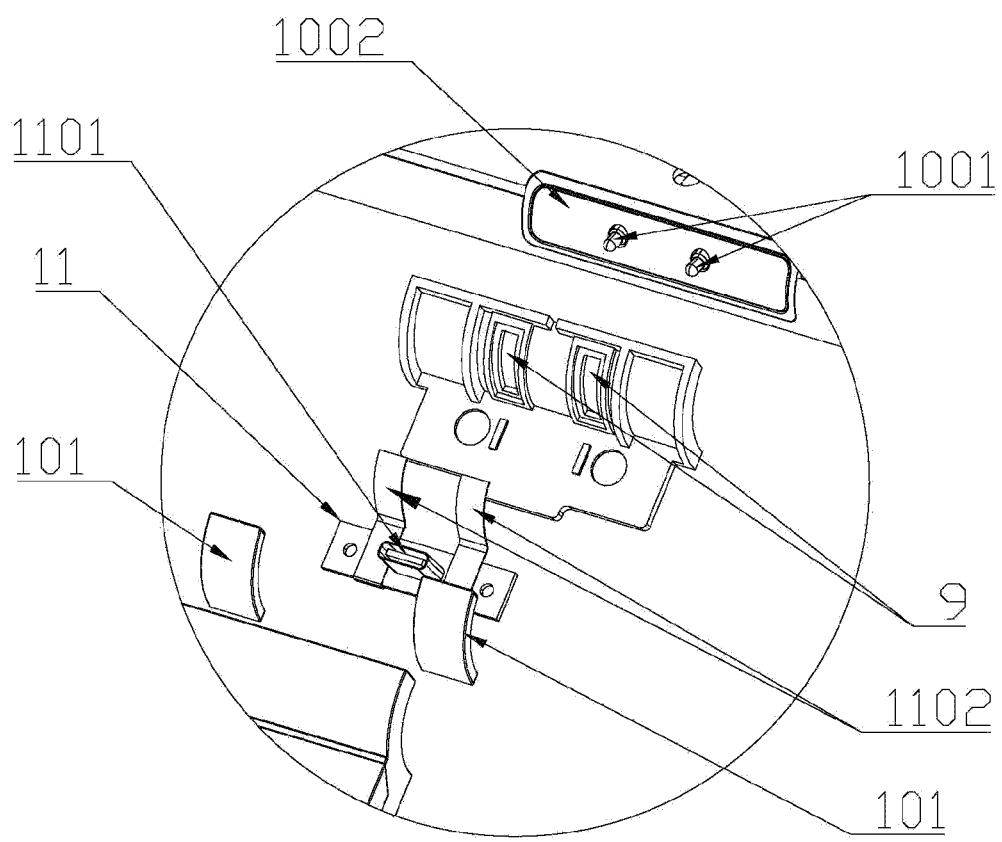
FIG. 6 is an enlarged diagram of a part A in FIG. 5.

List of Reference Numerals: 1 object connecting structure; 101 first attracting element; 2 first clamping structure; 201 first connecting part; 202 abutting part; 203 first adapter matching part; 2031 second through hole; 2032 first mounting cavity; 2033 first shielding cover; 3 second clamping structure; 301 first accommodating cavity; 302 first adapter part; 3021 first through hole; 303 second adapter matching part; 3031 fourth through hole; 3032 second mounting cavity; 3033 second shielding cover; 304 second connecting part; 305 first connecting cover; 4 third clamping structure; 401 second accommodating cavity; 402 second adapter part; 4021 third through hole; 403 third connecting part; 404 second connecting cover; 405 non-slip pad; 5 counterweight structure; 501 first counterweight; 502 second counterweight; 6 first rotating shaft; 601 first anti-separating projection; 602 first rotating shaft body; 603 first locking element; 7 second rotating shaft; 701 second anti-separating projection; 702 second rotating shaft body; 703 second locking element; 8 first opening; 9 second opening; 10 light source; 1001 conductive input element; 1002 second attracting element; 11 power supply structure; 1101 power input port; 1102 conductive output element.

DETAILED DESCRIPTION OF THE INVENTION

The specific implementations of the present invention are further described in detail below with reference to drawings and embodiments. The following embodiments are used to illustrate the present invention, but not to limit the scope of the present invention.

As shown in FIG. 1 to FIG. 14, a fixing clamp includes an object connecting structure 1, a first clamping structure 2, a second clamping structure 3 and a third clamping structure 4 arranged in sequence, wherein the object connecting structure 1 is arranged on the first clamping structure 2 for connecting an object to be fixed, and the first clamping structure 2 and the third clamping structure 4 are rotationally mounted on two ends of the second clamping structure 3 respectively; at least one of the second clamping structure 3 and the third clamping structure 4 is equipped with a counterweight structure 5; and the first clamping structure 2 includes a first connecting part 201 connected to the second clamping structure 3, and an abutting part 202 protruding from the first connecting part 201.

With the above structure, a user connects an object to be fixed to the object connecting structure 1, then abuts the abutting part 202 in the first clamping structure 2 against the clamped object, and adjusts the second clamping structure 3 and the third clamping structure 4 by means of rotation to enable the third clamping structure 4 to be in contact with the clamped object, so that the fixing clamp is adapted to the shape of the clamped object for clamping. Furthermore, because at least one of the second clamping structure 3 and the third clamping structure 4 is equipped with the counterweight structure 5, by adjusting the second clamping structure 3 and the third clamping structure 4 by means of rotation, the position of the center of gravity of the fixing clamp can also be adjusted to balance the center of gravity between the object to be fixed and the fixing clamp, so as to prevent the separation of the fixing clamp and the clamped object caused by imbalance of the center of gravity.

Figure 14:
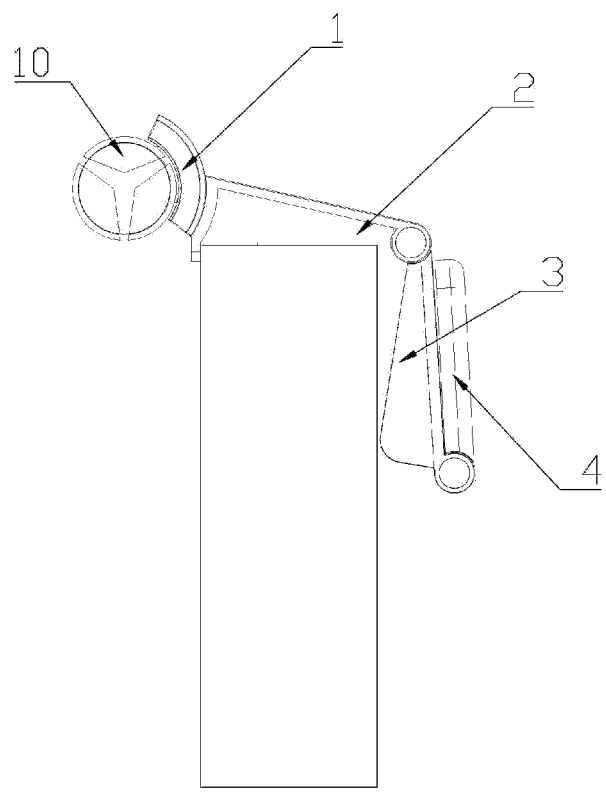
FIG. 14 is a schematic structural diagram of a fixing clamp (hanging lamp) that can be clamped by a second clamping structure when clamped by the second clamping structure according to the present invention.

Of course, the user can also abut the abutting part 202 in the first clamping structure 2 against the clamped object, rotate the third clamping structure 4 to the side away from the clamped object, and then rotate the second clamping structure 3 to enable the second clamping structure 3 to be in contact with the clamped object to realize fixation. The appearance of the product is properly processed to ensure that the second clamping structure 3 can be in contact with the third clamping structure 4, thereby increasing the aesthetics and practicability of the product, as shown in FIG. 14.

Preferably, both the second clamping structure 3 and the third clamping structure 4 are equipped with counterweight structures 5.

With the above structure, because the second clamping structure 3 is rotationally connected to the first clamping structure 2 and the third clamping structure 4 is rotationally connected to the second clamping structure 3, by adjusting the second clamping structure 3 by means of rotation, the center of gravity of the fixing clamp can be changed, and by adjusting the third clamping structure 4 by means of rotation, the center of gravity of the fixing clamp can be changed. Therefore, by cooperative adjustment, the balance of the center of gravity of the fixing clamp can be realized more easily, which is convenient for the user to use.

Preferably, the counterweight structure 5 includes a first counterweight 501, the second clamping structure 3 is provided with a first accommodating cavity 301, and the first counterweight 501 is placed in the first accommodating cavity 301;

the counterweight structure 5 includes a second counterweight 502, the third clamping structure 4 is provided with a second accommodating cavity 401, and the second counterweight 502 is placed in the second accommodating cavity 401.

Figure 12:
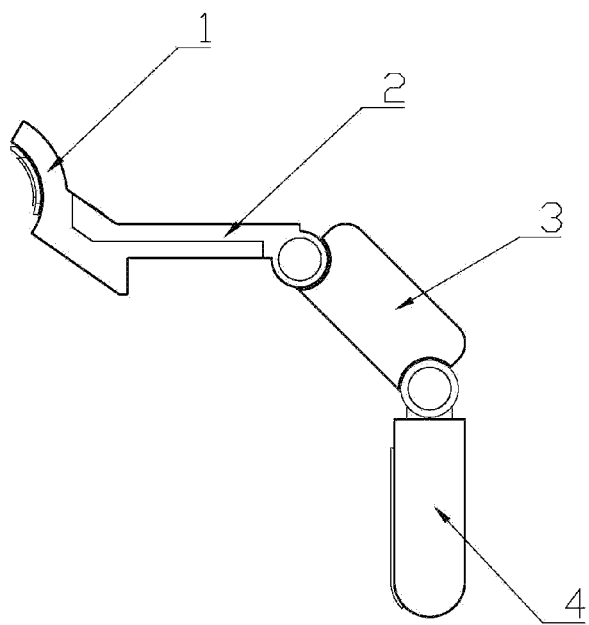
FIG. 12 is a schematic structural diagram of a second clamping structure of a fixing clamp according to the present invention after heightening treatment.
Figure 13:
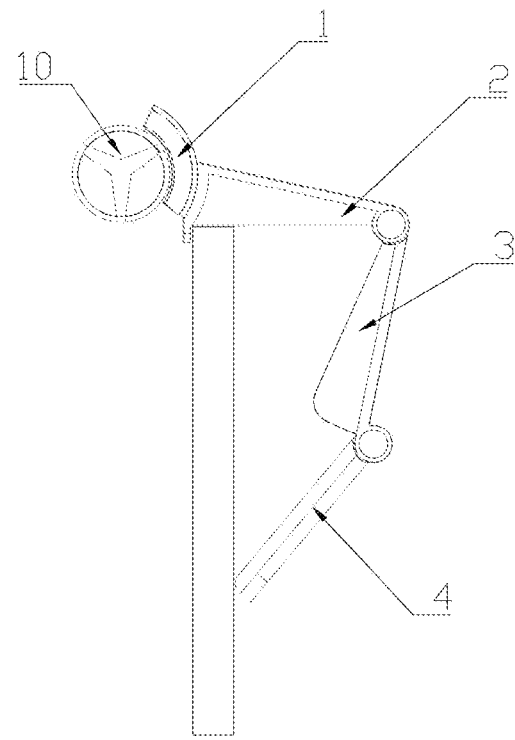
FIG. 13 is a schematic structural diagram of a fixing clamp (hanging lamp) that can be clamped by a second clamping structure when clamped by a third clamping structure according to the present invention.

As shown in FIG. 12, preferably, the second clamping structure 3 is heightened to accommodate a larger first counterweight 501 to facilitate the use.

Preferably, the second clamping structure 3 includes a first adapter part 302 provided with a first through hole 3021, and the first clamping structure 2 includes a first adapter matching part 203 arranged on the side surface of the first adapter part 302 and provided with a second through hole 2031; the first adapter part 302 and the first adapter matching part 203 are rotationally connected by a first rotating shaft 6 passing through the first through hole 3021 and the second through hole 2031; both ends of the first rotating shaft 6 are convexly provided with first anti-separating projections 601 for preventing the first rotating shaft 6 from separating from the first through hole 3021 and the second through hole 2031;

the third clamping structure 4 includes a second adapter part 402 provided with a third through hole 4021, and the second clamping structure 3 includes a second adapter matching part 303 arranged on the side surface of the second adapter part 402 and provided with a fourth through hole 3031; the second adapter part 402 and the second adapter matching part 303 are rotationally connected by a second rotating shaft 7 passing through the third through hole 4021 and the fourth through hole 3031; and both ends of the second rotating shaft 7 are convexly provided with second anti-separating projections 701 for preventing the second rotating shaft 7 from separating from the third through hole 4021 and the fourth through hole 3031.

Preferably, the first adapter matching part 203 is recessed to form a first mounting cavity 2032, the bottom surface of the first mounting cavity 2032 is provided with the second through hole 2031, and the first anti-separating projection 601 formed on the outer side of the second through hole 2031 is placed in the first mounting cavity 2032; the first mounting cavity 2032 is provided with a first shielding cover 2033 for shielding the opening of the first mounting cavity 2032 in a matched mode;

the second adapter matching part 303 is recessed to form a second mounting cavity 3032, the bottom surface of the second mounting cavity 3032 is provided with the fourth through hole 3031, and the second anti-separating projection 701 formed on the outer side of the fourth through hole 3031 is placed in the second mounting cavity 3032; and the second mounting cavity 3032 is provided with a second shielding cover 3033 for shielding the opening of the second mounting cavity 3032 in a matched mode.

With the above structure, the first anti-separating projection 601 outside the first through hole 3021 and the second anti-separating projection 701 outside the second through hole 2031 are hidden respectively by the first mounting cavity 2032 and the first shielding cover 2033 as well as the second mounting cavity 3032 and the second shielding cover 3033, so that the appearance of the fixing clamp is more aesthetic.

Preferably, the first rotating shaft 6 includes a first rotating shaft body 602 and a first locking element 603, one end of the first rotating shaft body 602 is convexly provided with a first anti-separating projection 601, the other end of the first rotating shaft body is detachably connected to the first locking element 603, and the first locking element protrudes from the first rotating shaft body 602 to form the first anti-separating projection 601 at one end of the first rotating shaft body 602 on which the first locking element 603 is mounted;

the second rotating shaft 7 includes a second rotating shaft body 702 and a second locking element 703, one end of the second rotating shaft body 702 is convexly provided with a second anti-separating projection 701, the other end of the second rotating shaft body is detachably connected to the second locking element 703, and the second locking element protrudes from the second rotating shaft body 702 to form the second anti-separating projection 701 at one end of the second rotating shaft body 702 on which the second locking element 703 is mounted.

With the above structure, the first adapter matching part 203 is placed on the outer side of the first adapter part 302, and the first rotating shaft body 602 passes through the first through hole 3021 and the second through hole 2031 and is then connected to the first locking element 603, thereby realizing rotational mounting of the first adapter matching part 203 and the first adapter part 302; and the second adapter matching part 303, the second adapter part 402, the second rotating shaft body 702 and the second locking element 703 can be rotationally mounted in the same mode as described above.

Preferably, the distance between the first locking element 603 and the first anti-separating projection 601 protruding from the first rotating shaft body 602 can be adjusted; and the distance between the second locking element 703 and the second anti-separating projection 701 protruding from the second rotating shaft body 702 can be adjusted.

With the above structure, by adjusting the distance between the first locking element 603 and the first anti-separating projection 601 protruding from the first rotating shaft body 602, the damping force between the first adapter matching part 203 and the first adapter part 302 can be adjusted; and by adjusting the distance between the second locking element 703 and the second anti-separating projection 701 protruding from the second rotating shaft body 702, the damping force between the second adapter matching part 303 and the second adapter part 402 can be adjusted.

Preferably, the first rotating shaft body 602 is in threaded connection with the first locking element 603, and the second rotating shaft body 702 is in threaded connection with the second locking element 703.

With the above structure, by means of threaded connection, the detachable connection between the first rotating shaft body 602 and the first locking element 603 as well as between the second rotating shaft body 702 and the second locking element 703 can be realized, and the distance between the first anti-separating projections 601 protruding from the first rotating shaft body 602 as well as between the second anti-separating projections 701 protruding from the second rotating shaft body 702 can be adjusted.

Preferably, both sides of the first adapter part 302 are provided with the first adapter matching parts 203, and the diameter of the first anti-separating projection 601 is greater than the aperture of the second through hole 2031; and both sides of the second adapter part 402 are provided with the second adapter matching parts 303, and the diameter of the second anti-separating projection 701 is greater than the aperture of the fourth through hole 3031.

With the above structure, the connection between the first adapter part 302 and the first adapter connecting part as well as between the second adapter part 402 and the second adapter connecting part is more stable; and the first anti-separating projections 601 on both sides of the first rotating shaft 6 can be hidden in the first mounting cavity 2032, and the second anti-separating projections 701 on both sides of the second rotating shaft 7 can be hidden in the second mounting cavity 3032.

Preferably, the first locking element 603 uses an angular nut, and the first mounting cavity 2032 for accommodating the first locking element 603 is matched with the first locking element 603; and the second locking element 703 uses an angular nut, and the second mounting cavity 3032 for accommodating the second locking element 703 is matched with the second locking element 703.

With the above structure, the first locking element 603 uses an angular nut such as a hexagonal nut, the first locking element 603 is placed in the first mounting cavity 2032 for accommodating the first locking element 603, and the first mounting cavity 2032 is matched with the first locking element 603 to limit the first locking element 603 so as to prevent the first locking element from rotating, which facilitates the mounting of the first rotating shaft body 602 and the first locking element 603; and the mounting of the second locking element 703 and the second mounting cavity 3032 for accommodating the second locking element 703 is the same as described above.

Preferably, the second clamping structure 3 includes a second connecting part 304 provided with a groove and a first connecting cover 305 configured to shield the opening of the groove of the second connecting part 304, and the second connecting part 304 and the first connecting cover 305 are clamped to form the first accommodating cavity 301;

the third clamping structure 4 includes a third connecting part 403 provided with a groove and a second connecting cover 404 configured to shield the opening of the groove of the third connecting part 403, and the third connecting part 403 and the second connecting cover 404 are clamped to form the second accommodating cavity 401.

Specifically, the second connecting part 304 is provided with a groove having an opening in the bottom surface, and the first connecting cover 305 is convexly provided with a clamping stud toward the second connecting part 304; correspondingly, the bottom surface of the groove of the second connecting part 304 is provided with a clamping cylinder matched with the clamping stud, the clamping stud is clamped into the clamping cylinder to realize the mounting of the second connecting part 304 and the first connecting cover 305, and the first counterweight 501 is provided with an avoiding area for avoiding the clamping cylinder; and the first adapter part 302 is arranged on the first connecting cover 305, and the second adapter matching part 303 is arranged on the second connecting part 304.

Specifically, the third connecting part 403 is provided with a groove having an opening in a side surface, the edge of the opening of the groove of the third connecting part 403 is recessed inward to form a step surface, and the second connecting cover 404 is matched with the step surface to realize clamping.

Preferably, the inner side of the third clamping structure 4 is provided with a non-slip pad 405.

With the above structure, the third clamping structure 4 and the clamped object are prevented from slipping, so that the clamping capability of the fixing clamp is improved.

A hanging lamp includes a light source 10 and a fixing clamp, wherein the fixing clamp uses the above fixing clamp, and the light source 10 is connected to the object connecting structure 1.

With the above structure, by adjusting the fixing clamp, the hanging lamp can be applicable to various special-shaped screens without the need for a square display screen, and is also applicable to display screens in various thicknesses, so that the hanging lamp has better applicability.

Preferably, the hanging lamp includes a power supply structure 11 provided with a power input port 1101 and a conductive output element 1102, wherein the power supply structure 11 is placed in the fixing clamp, the surface of the fixing clamp is provided with a first opening 8 for exposing the power input port 1101, the conductive output element 1102 is arranged close to the end surface of the object connecting structure 1 in contact with the light source 10, and the end surface of the object connecting structure 1 in contact with the light source 10 is provided with a second opening 9 for exposing the conductive output element 1102; and correspondingly, the light source 10 is provided with a conductive input element 1001 matched with the conductive output element 1102.

With the above structure, the external power wire is connected to the power input port 1101, and the conductive input element 1001 of the light source 10 is connected to the conductive output element 1102, thereby realizing power transmission.

Specifically, the object connecting structure 1 is provided with an accommodating cavity for accommodating the power supply structure 11; and the conductive output element 1102 is a conductive sheet, the conductive input element 1001 is a conductive terminal, and the conductive terminal is in contact with the conductive sheet to conduct electricity.

Preferably, the second opening 9 is a sliding groove, and the conductive input element 1001 is matched with the second opening 9 slidably.

With the above structure, the light source 10 is rotated, and the conductive input element 1001 slides along the second opening 9 and can be connected to the conductive output element 1102 to realize angle adjustment of the light source 10.

Preferably, the object connecting structure 1 is provided with a first attracting element 101, and the light source 10 is provided with a second attracting element 1002 matched with the first attracting element 101; the light source 10 is fixed by means of cooperation of the first attracting element 101 and the second attracting element 1002; and specifically, the first attracting element 101 and the second attracting element 1002 are respectively a magnet and a metal that can be attracted by the magnet.

Figure 15:
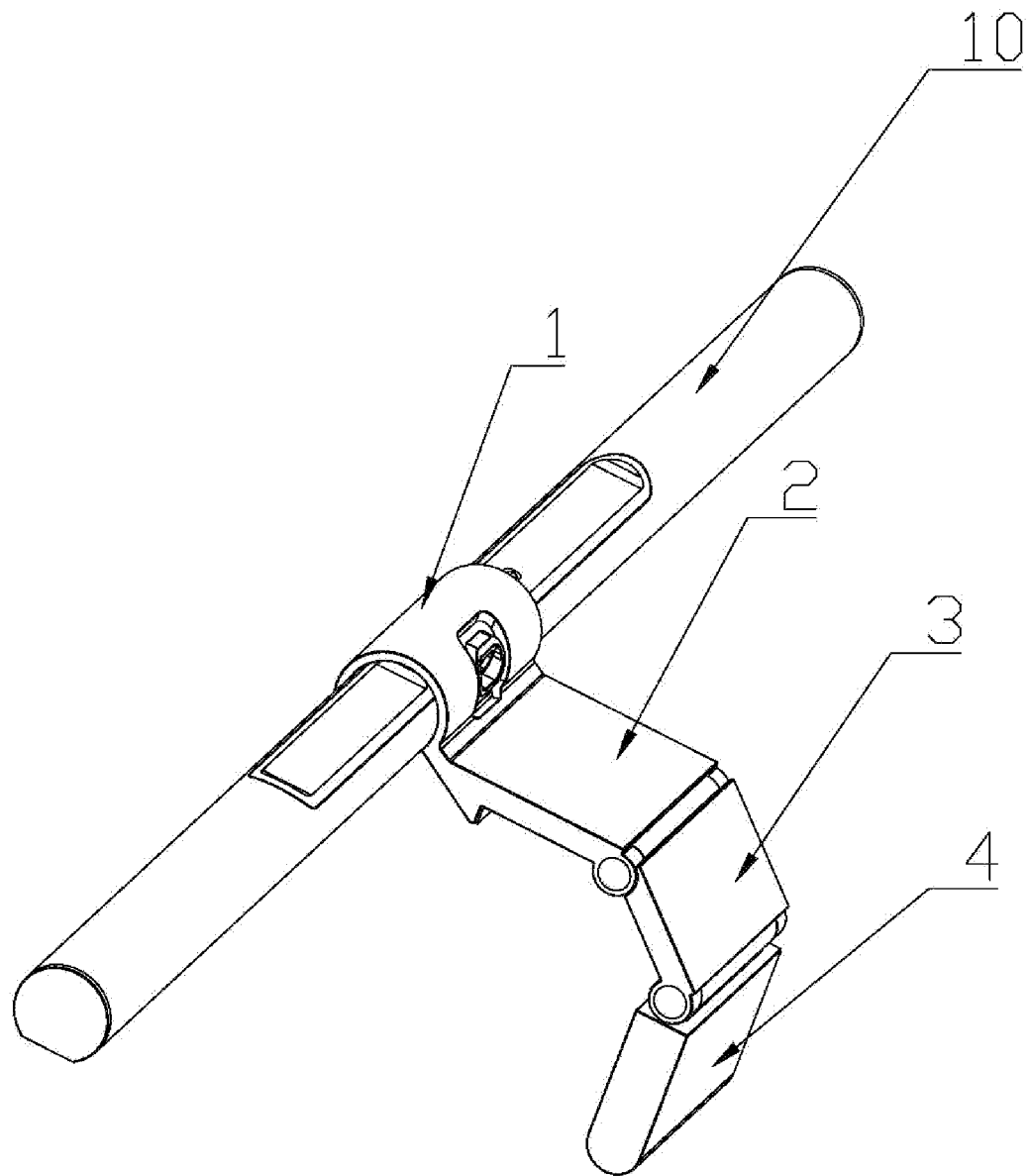
FIG. 15 is a schematic structural diagram in which a fixing clamp and a light source in a hanging lamp according to the present invention are fixed by buckling.

As shown in FIG. 15, preferably, the object connecting structure 1 and the light source 10 are connected and fixed to each other in a form of buckling.

Specifically, the shape of the object connecting structure 1 is matched with the shape of the light source 10, an elastic gap is formed to obtain elasticity, such that the fixation and separation of the light source 10 are realized by elastically opening and closing the gap. Generally, under the condition that the object connecting structure 1 and the light source 10 are connected to each other in a form of buckling, the external power wire is directly connected to the light source 10. The object connecting structure 1 is provided with an avoiding hole for connection of the external power wire and the light source.

Figure 7:
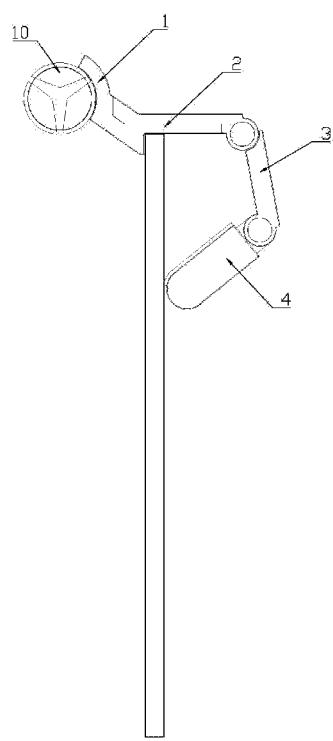
FIG. 7 is a reference diagram of a use state of a fixing clamp (hanging lamp) according to the present invention fixed on a thin object.
Figure 8:
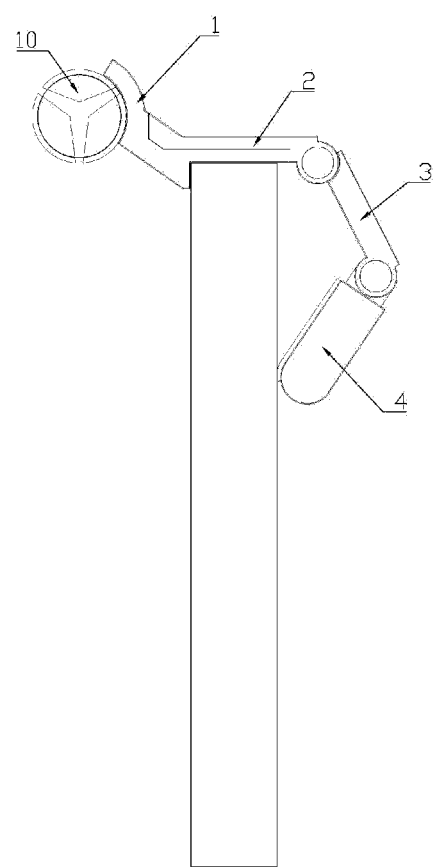
FIG. 8 is a reference diagram of a use state of a fixing clamp (hanging lamp) according to the present invention fixed on a thick object.
Figure 9:
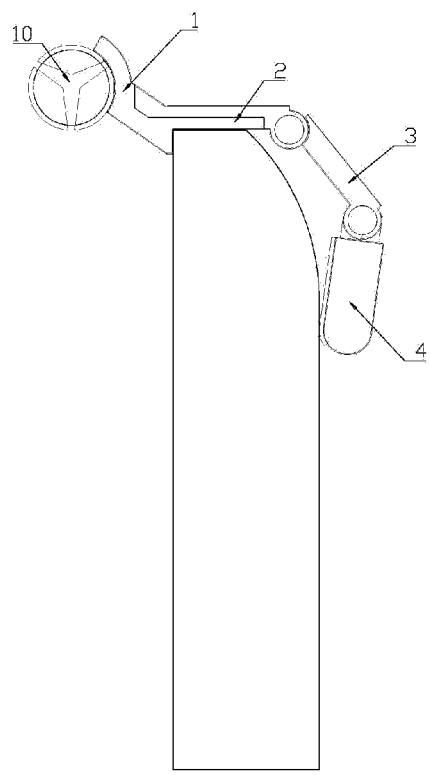
FIG. 9 is a reference diagram of a use state of a fixing clamp (hanging lamp) according to the present invention fixed on a thick special-shaped object.
Figure 10:
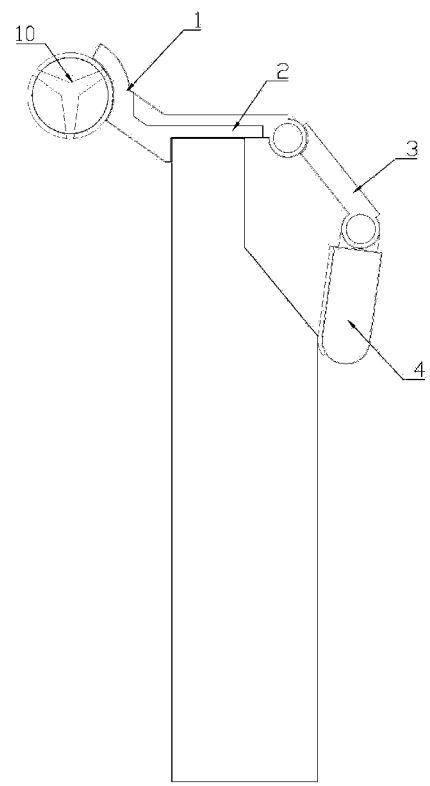
FIG. 10 is a reference diagram of a use state of a fixing clamp (hanging lamp) according to the present invention fixed on another thick special-shaped object.
Figure 11:
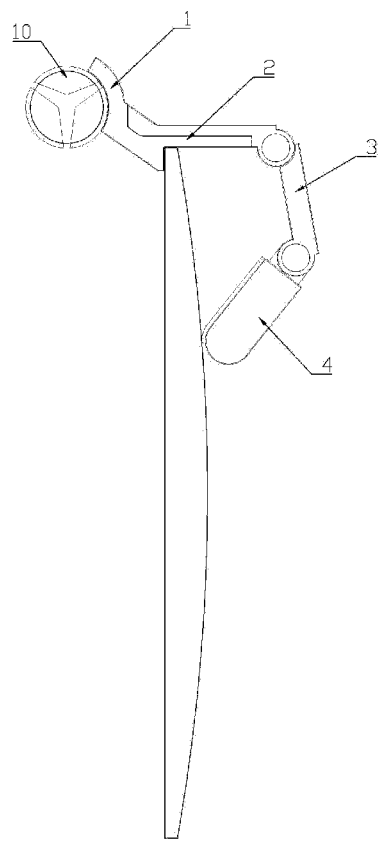
FIG. 11 is a reference diagram of a use state of a fixing clamp (hanging lamp) according to the present invention fixed on a thin special-shaped object.

The fixing clamp and the hanging lamp of the present invention can be fixed on a thin screen, as shown in FIG. 7, can also be fixed on a thick screen, as shown in FIG. 8, or can be fixed on special-shaped screens, as shown in FIG. 9, FIG. 10 and FIG. 11.

The above are only the preferred embodiments of the present invention. It should be noted that a person of ordinary skilled in the art can make several improvements and modifications without departing from the technical principles of the present invention, and these improvements and modifications should also be regarded as the protection scope of the present invention.

What is claimed is:

1. A fixing clamp, comprising an object connecting structure (1), a first clamping structure (2), a second clamping structure (3) and a third clamping structure (4) arranged in sequence, wherein the object connecting structure (1) is arranged on the first clamping structure (2) for connecting an object to be fixed, and the first clamping structure (2) and the third clamping structure (4) are rotationally mounted on two ends of the second clamping structure (3) respectively; at least one of the second clamping structure (3) and the third clamping structure (4) is equipped with a counterweight structure (5); and the first clamping structure (2) comprises a first connecting part (201) connected to the second clamping structure (3), and an abutting part (202) protruding from the first connecting part (201);

wherein the counterweight structure (5) comprises a first counterweight (501), the second clamping structure (3) has a first accommodating cavity (301), and the first counterweight (501) is placed in the first accommodating cavity (301);

the counterweight structure (5) comprises a second counterweight (502), the third clamping structure (4) has a second accommodating cavity (401), and the second counterweight (502) is placed in the second accommodating cavity (401).

2. The fixing clamp according to claim 1, wherein the second clamping structure (3) comprises a first adapter part (302) provided with a first through hole (3021), and the first clamping structure (2) comprises a first adapter matching part (203) arranged on the side surface of the first adapter part (302) and provided with a second through hole (2031); the first adapter part (302) and the first adapter matching part (203) are rotationally connected by a first rotating shaft (6) passing through the first through hole (3021) and the second through hole (2031); both ends of the first rotating shaft (6) are convexly provided with first anti-separating projections (601) for preventing the first rotating shaft (6) from separating from the first through hole (3021) and the second through hole (2031);

the third clamping structure (4) comprises a second adapter part (402) provided with a third through hole (4021), and the second clamping structure (3) comprises a second adapter matching part (303) arranged on the side surface of the second adapter part (402) and provided with a fourth through hole (3031); the second adapter part (402) and the second adapter matching part (303) are rotationally connected by a second rotating shaft (7) passing through the third through hole (4021) and the fourth through hole (3031); and both ends of the second rotating shaft (7) are convexly provided with second anti-separating projections (701) for preventing the second rotating shaft (7) from separating from the third through hole (4021) and the fourth through hole (3031).

3. The fixing clamp according to claim 2, wherein the first adapter matching part (203) is recessed to form a first mounting cavity (2032), the bottom surface of the first mounting cavity (2032) is provided with the second through hole (2031), and the first anti-separating projection (601) formed on the outer side of the second through hole (2031) is placed in the first mounting cavity (2032); the first mounting cavity (2032) is provided with a first shielding cover (2033) for shielding the opening of the first mounting cavity (2032) in a matched mode;

the second adapter matching part (303) is recessed to form a second mounting cavity (3032), the bottom surface of the second mounting cavity (3032) is provided with the fourth through hole (3031), and the second anti-separating projection (701) formed on the outer side of the fourth through hole (3031) is placed in the second mounting cavity (3032); and the second mounting cavity (3032) is provided with a second shielding cover (3033) for shielding the opening of the second mounting cavity (3032) in a matched mode.

4. The fixing clamp according to claim 2, wherein the first rotating shaft (6) comprises a first rotating shaft body (602) and a first locking element (603), one end of the first rotating shaft body (602) is convexly provided with the first anti-separating projection (601), the other end of the first rotating shaft body is detachably connected to the first locking element (603), and the first locking element protrudes from the first rotating shaft body (602) to form the first anti-separating projection (601) at one end of the first rotating shaft body (602) on which the first locking element (603) is mounted;

the second rotating shaft (7) comprises a second rotating shaft body (702) and a second locking element (703), one end of the second rotating shaft body (702) is convexly provided with a second anti-separating projection (701), the other end of the second rotating shaft body is detachably connected to the second locking element (703), and the second locking element protrudes from the second rotating shaft body (702) to form the second anti-separating projection (701) at one end of the second rotating shaft body (702) on which the second locking element (703) is mounted.

5. The fixing clamp according to claim 2, wherein both sides of the first adapter part (302) are provided with the first adapter matching parts (203), and the diameter of the first anti-separating projection (601) is greater than the aperture of the second through hole (2031);

both sides of the second adapter part (402) are provided with the second adapter matching parts (303), and the diameter of the second anti-separating projection (701) is greater than the aperture of the fourth through hole (3031).

6. The fixing clamp according to claim 1, wherein the second clamping structure (3) comprises a second connecting part (304) provided with a groove and a first connecting cover (305) configured to shield the opening of the groove of the second connecting part (304), and the second connecting part (304) and the first connecting cover (305) are clamped to form the first accommodating cavity (301);

the third clamping structure (4) comprises a third connecting part (403) provided with a groove and a second connecting cover (404) configured to shield the opening of the groove of the third connecting part (403), and the third connecting part (403) and the second connecting cover (404) are clamped to form the second accommodating cavity (401).

7. The fixing clamp according to claim 1, wherein the inner side of the third clamping structure (4) is provided with a non-slip pad (405).

8. A hanging lamp, comprising a light source (10) and a fixing clamp, wherein the fixing clamp uses the fixing clamp according to claim 1, and the light source (10) is connected to the object connecting structure (1).

9. The hanging lamp according to claim 8, comprising a power supply structure (11) provided with a power input port (1101) and a conductive output element (1102), wherein the power supply structure (11) is placed in the fixing clamp, the surface of the fixing clamp is provided with a first opening (8) for exposing the power input port (1101), the conductive output element (1102) is arranged close to the end surface of the object connecting structure (1) in contact with the light source (10), and the end surface of the object connecting structure (1) in contact with the light source (10) is provided with a second opening (9) for exposing the conductive output element (1102); and correspondingly, the light source (10) is provided with a conductive input element (1001) matched with the conductive output element (1102).

* * * * *